United States Patent
Wu et al.

(10) Patent No.: US 8,571,269 B2
(45) Date of Patent: Oct. 29, 2013

(54) IMAGE QUALITY DEFECT DETECTION VIA SENSOR CHARACTERIZATION AND HALFTONE DOT CLASSIFICATION

(75) Inventors: Wencheng Wu, Webster, NY (US); Beilei Xu, Penfield, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 226 days.

(21) Appl. No.: 13/049,191

(22) Filed: Mar. 16, 2011

(65) Prior Publication Data
US 2012/0237087 A1 Sep. 20, 2012

(51) Int. Cl.
*G06K 9/00* (2006.01)

(52) U.S. Cl.
USPC ............ 382/112; 382/149; 382/154; 382/165

(58) Field of Classification Search
USPC ................................. 382/112, 149, 154, 165
See application file for complete search history.

(56) References Cited

U.S. PATENT DOCUMENTS

| | | | |
|---|---|---|---|
| 6,435,654 B1 | 8/2002 | Wang et al. | |
| 6,597,473 B1 * | 7/2003 | Rasmussen et al. | 358/1.9 |
| 6,639,669 B2 * | 10/2003 | Hubble et al. | 356/319 |
| 6,782,129 B1 * | 8/2004 | Li et al. | 382/176 |
| 6,865,000 B2 * | 3/2005 | Yushiya | 358/518 |
| 7,810,896 B2 | 10/2010 | Mizes et al. | |
| 2002/0063719 A1 * | 5/2002 | Ziobro | 345/582 |
| 2008/0013848 A1 * | 1/2008 | Wu et al. | 382/254 |
| 2010/0014121 A1 * | 1/2010 | Hyuga et al. | 358/3.06 |
| 2010/0080487 A1 * | 4/2010 | Yitzhaky et al. | 382/266 |
| 2010/0303281 A1 | 12/2010 | Wu et al. | |
| 2011/0052010 A1 | 3/2011 | Xu et al. | |

OTHER PUBLICATIONS

Wu et al., U.S. Appl. No. 12/906,694, filed Oct. 18, 2010.

* cited by examiner

*Primary Examiner* — Bernard Krasnic
*Assistant Examiner* — Weiwen Yang
(74) *Attorney, Agent, or Firm* — Philip E. Blair; Fleit Gibbons Gutman Bongini & Bianco P.L.

(57) ABSTRACT

What is disclosed is a system and method for image quality (IQ) defect detection via classification of halftone dots present on customer prints. In one embodiment, spatially-varying thresholds are applied on the sensed image in order to classify the halftone dots for IQ defect detection. The resolving power of the sensor is characterized and the sensor responses to patches printed with the print device are characterized. A de-blurring filter is designed which is appropriate for compensating the characterized resolving power of the sensor. Image enhancement is applied to the image using the de-blurring filter. Halftone dots present on the prints are classified by analyzing the enhanced image with the results of the sensor response characterization. Once classified, single separation halftone dot images can be more readily analyzed for defects. The present method allows sensor resolution as low as the size of the halftone dots of the printer under test.

8 Claims, 10 Drawing Sheets

| PATCH | PRINTER CMYK INPUTS | | | | SCANNER RGB OUTPUT STATISTICS | | | | | |
|---|---|---|---|---|---|---|---|---|---|---|
| | | | | | AVERAGE | | | STANDARD DEVIATION | | |
| | C | M | Y | K | μR | μG | μB | σR | σG | σB |
| 1 | 0 | 0 | 0 | 0 | 242.8 | 241.8 | 236.9 | 3.3 | 3.5 | 4.2 |
| 2 | 0 | 0 | 0 | 100 | 8.0 | 8.1 | 8.4 | 1.0 | 1.0 | 1.3 |
| 3 | 0 | 0 | 100 | 0 | 231.6 | 194.5 | 0.0 | 2.8 | 2.8 | 0.0 |
| 4 | 0 | 0 | 100 | 100 | 8.3 | 8.3 | 8.7 | 0.8 | 0.8 | 1.0 |
| 5 | 0 | 100 | 0 | 0 | 158.4 | 15.2 | 98.0 | 2.9 | 2.0 | 3.8 |
| 6 | 0 | 100 | 0 | 100 | 8.3 | 8.2 | 8.5 | 0.8 | 0.8 | 1.1 |
| 7 | 0 | 100 | 100 | 0 | 156.1 | 15.4 | 5.3 | 3.0 | 2.7 | 1.4 |
| 8 | 0 | 100 | 100 | 100 | 8.5 | 8.5 | 8.9 | 1.1 | 1.1 | 1.3 |
| 9 | 100 | 0 | 0 | 0 | 1.9 | 85.5 | 142.7 | 0.9 | 2.6 | 3.2 |
| 10 | 100 | 0 | 0 | 100 | 8.4 | 8.2 | 8.6 | 0.8 | 0.9 | 1.1 |
| 11 | 100 | 0 | 100 | 0 | 9.7 | 70.5 | 0.0 | 1.5 | 3.0 | 0.0 |
| 12 | 100 | 0 | 100 | 100 | 8.3 | 8.3 | 8.8 | 1.1 | 1.2 | 1.4 |
| 13 | 100 | 100 | 0 | 0 | 11.7 | 16.8 | 70.5 | 1.1 | 1.3 | 2.8 |
| 14 | 100 | 100 | 0 | 100 | 7.5 | 7.8 | 8.2 | 0.8 | 0.8 | 1.0 |
| 15 | 100 | 100 | 100 | 0 | 8.5 | 8.8 | 9.2 | 0.8 | 0.8 | 1.0 |
| 16 | 100 | 100 | 100 | 100 | 7.9 | 8.1 | 8.5 | 0.8 | 0.8 | 1.0 |

FIG. 7
(SCANS OF 16 PRIMARIES OF PHASER 8560)

IMAGE QUALITY DEFECT DETECTION VIA SENSOR CHARACTERIZATION AND HALFTONE DOT CLASSIFICATION

TECHNICAL FIELD

The present invention is directed to systems and methods which compensate for the resolving power deficiency of a sensor in order to classify halftone dots present on a customer's print for image quality defect detection.

BACKGROUND

To meet customer demand, the ability to detect and identify image quality defects such as weak or missing jets during a print run is critical for some printers. Missing jets produce thin sharp streaks which are visible. Such streaks are objectionable to a customer. Countermeasures can be applied in the print engine to correct or mitigate the effects of missing jets. In order to apply these countermeasures, it is often necessary to reliably know the location and color separation identity of the missing jets. Missing jets can appear at any time, so it is necessary to look for them rather frequently. It is relatively straight-forward to detect and identify image quality (IQ) defects such as weak or missing jets (WMJ) with the use of test patterns. However, it is undesirable to insert test patterns into a customer's job. Not only does this waste paper and reduce productivity, but these pages need to be removed from the job. This adds cost and complexity to a print job and provides opportunities for mistakes to occur. Consequently it is desirable to be able to detect such defects using scanned images of actual customer prints rather than test patterns.

Methods have arisen which attempt to identify, at a pixel-level, the color of each halftone dot and then analyze the dots for defects. For approaches that do not identify individual halftone dots directly, the resolution can be lower but they require some form of mapping that relates the average sensor outputs to the average colorant inputs for all possible levels. Such derived mapping using a RGB sensor for a CMYK printer is non-unique. Additional information, such as GCR level used, is often needed. For approaches that attempt to identify individual halftone dots directly, there is no need to derive or apply the above mapping. However, these require higher sensing resolution so that the halftone dots can be properly resolved (generally 2-times to 4-times higher resolution depending on the sensor MTF). A suitable sensor for this category would be a 1200DPI×1200DPI or even a 2400DPI×2400DPI RGB FWA. This may not be viable for all printing systems.

Accordingly, what is needed in this art are increasingly sophisticated systems and methods which overcome the challenges of insufficient sensor resolution in high speed printing systems such that halftone dots present on a customer's print can be analyzed for image quality defect detection.

Incorporated References

The following U.S. patents, U.S. patent applications, and Publications are incorporated herein in their entirety by reference.

"Systems And Methods For Monitoring Jets With Full Width Array Linear Sensors", U.S. Pat. No. 7,810,896, to Mizes et al.

"Identification Of Faulty Jets Via Sensing On Customer Images", U.S. Publication No. 20100303281, by Wu et al.

"Banding Defect Detection In Digital Imaging Systems", U.S. patent application Ser. No. 12/552,519, by Xu et al.

"Identification Of Faulty Jets Via Sensing On Customer Images", U.S. patent application Ser. No. 12/474,711 by Wu et al.

"System And Method For Detecting Missing Ink Jets In An Inkjet Printer Using Image Data Of Printed Documents Without Apriori Knowledge Of The Documents", U.S. application Ser. No. 12/906,694, by Wu et al.

"Color Calibration For Digital Halftoning", U.S. Pat. No. 6,435,654, to Wang et al.

BRIEF SUMMARY

What is disclosed is a novel system and method for image quality (IQ) defect detection via halftone dot classification. In one embodiment, the resolving power (e.g. MTF) of the sensor and the sensor responses (RGB) to patches printed are both characterized, and a de-blurring filter is designed which is appropriate for compensating for the resolving power deficiency of the sensor. Image enhancement is performed on the image using the filter response. The enhanced image is analyzed with the results of the characterized sensor response such that the halftone dots present on the print can be properly classified. Once classified, halftone dot images of single separation colors are analyzed to determine whether the color separation contains an image quality defect. The present method allows sensor resolution as low as the size of the halftone dot of the color marking device. The teachings hereof are advantageous for partial or missing jet detection and for detecting other image quality defects such as banding or mottle. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for image quality defect detection via classification of halftone dots present on a customer print. Two embodiments are disclosed. Although these embodiments are described in terms of cut-sheet printers and desktop scanners, it should be understood that the teachings hereof are not limited to such devices. In fact, the most important application of this invention is to inline-sensing systems, and in particular to high-speed continuous-feed presses. Moreover, although the discussion is in terms of WMJ detection in inkjet devices, this invention has much broader applicability.

It should be understood that one skilled in this art would be readily familiar with many facets of color science such as, but not limited to, color measuring devices, halftone processes, and other techniques common to this field of art. Additionally, one would also be readily familiar with advanced mathematical techniques used in color science. Those of ordinary skill would be familiar with the text: "*Digital Color Imaging Handbook*", 1st Ed., CRC Press (2003), ISBN-13: 97808-4930-9007, and "*Control of Color Imaging Systems: Analysis and Design*", CRC Press (2009), ISBN-13: 97808-4933-7468, both of which are incorporated herein in their entirety by reference.

Non-Limiting Definitions

A "document image" refers to a digital image of a document which has been scanned into a digitized form using an image input device as is generally known in the arts. Various document scanning devices generate a bitmap image of the scanned document. Bitmaps can be characterized by a width and height (X and Y dimensions) of the image in pixels and by a number of bits-per-pixel which defines a color depth, i.e., the number of colors a given pixel can represent. Generation of a document image is shown and discussed with respect to the functional overview of the embodiment of FIG. 1.

A "color separation" refers to an individual separation corresponding to one of the colorants of a target marking system. For example, there are 4 separations: C, M, Y, K for a 4-color CMYK printer.

A "single separation color" refers to a color specified with only one of the color separations for a color marking system. For example, for a CMYK printer, a C-only test patch is a single-separation color patch.

"Halftoning" is the process of representing a continuous tone (contone) image by a bi-level image such that, when viewed from a suitable distance, the bi-level image gives the same impression as the contone image. Halftoning is a technique which performs the step of converting the contone image to a bi-level image for achieving the desired impression mentioned above. A halftone screen describes the set of values which together make up the set of thresholds to be applied in a halftone screening process to generate the output patterns of halftone dots.

A "halftone dot" is the basic element of a binary printing system. The "classification of halftone dots," as used this invention, refers to identification of the colorant, or combination of colorants, of which the dot is composed. Such classification is useful in detecting the source of the defect, for example, in terms of which jet is weak or missing. The printed output of the subject marking device is converted to a digital image by a sensor, such as a scanner. A "pixel" is the smallest addressable element in the sensed digital image. In order to be useful for the applications discussed here, the size of the sensed pixel must be comparable to the size of the printed halftone dot, or smaller. When the size of the sensed pixel is comparable to the size of the printed halftone dot, the sensed pixels are used as approximations of the printed halftone dots.

"Compensating for the resolving power deficiency of a sensor" means characterizing a resolving power of the sensor and characterizing a response of a sensor with respect to a plurality of test patches printed using a color marking device such that a de-blurring filter can be designed which is appropriate for compensating for the (inadequate) resolving power of the sensor.

The "resolving power" of a sensor refers to its ability to resolve fine features in the object to be sensed. For example, a very sharp line may appear blurry from the sensed signals if the sensor suffers from resolving power deficiency. For another example, two small dots (say one magenta and one yellow from halftoning) that are closely located to each other may appear to be a larger red dot with a bit of magenta and yellow on the edges. This is one of the main reasons that limit the sensor's ability to detect individual halftone dots for this application. One common measure or description of the resolving power of a sensor is its MTF (Modulation Transfer Function), which is the percent amplitude sensed as a function of spatial frequency (e.g., cycles per millimeter, see FIG. 8).

"Analyzing halftone dots" means processing the halftone dots present on a print or portion thereof, which has been enhanced in accordance with the teachings hereof for discernable image quality defects. Typically a sensed digital image of the print is used, in which case one may analyze the pixels of the sensed image rather than analyze the halftone dots, particularly when the size of the sensed pixel is comparable to the size of the printed halftone dot as discussed above. For example, to detect weak or missing jets in C separation, we may first average the C halftone dot images in the process direction to get a 1-dimensional C profile and then analyze this 1-dimensional profile to see if there is a negative spike (abnormal attenuation in C usage) at any pixel location. For another example, to detect whether M mottle is present, we may compute the variation of M halftone dot images at a region of interest and compare it to the expected variation (e.g., from knowledge of original image content) of M halftone dot images at the same region of interest. Other image quality detection methods previously disclosed in references can be used to analyze halftone dots for image quality detection as well.

An "image quality defect" is a defect or anomaly in a hardcopy print or document as defined by an image quality metric. International Print Quality Standard—
  ISO/IEC 13660:2001 specifies device-independent image quality metrics, measurement methods, and analytical procedures which are used in this art to describe a quality of an image generated by an image output device.

An "image input device" is a device which generates a document or which converts the hardcopy print or document into digital format image and is intended to encompass a wide variety of devices. One example document scanner is shown at 104 of FIG. 1. Document scanning devices may be placed in communication with print devices, workstations, networked platforms such as servers and client devices, to name a few.

An "image output device" is any device capable of rendering an image of a document. The set of image output devices includes digital document reproduction equipment, xerographic systems, inkjet systems, photographic production and reproduction equipment, including a wide variety of marking devices as are known in the arts. One example image output device is shown at 118 of FIG. 1.

"Rendering" is intended to mean reducing a signal of an image to a viewable form such as a hardcopy print. Rendering may also mean saving the image to a storage device such as a disk drive or to a memory.

Example Networked System

Figure 1:
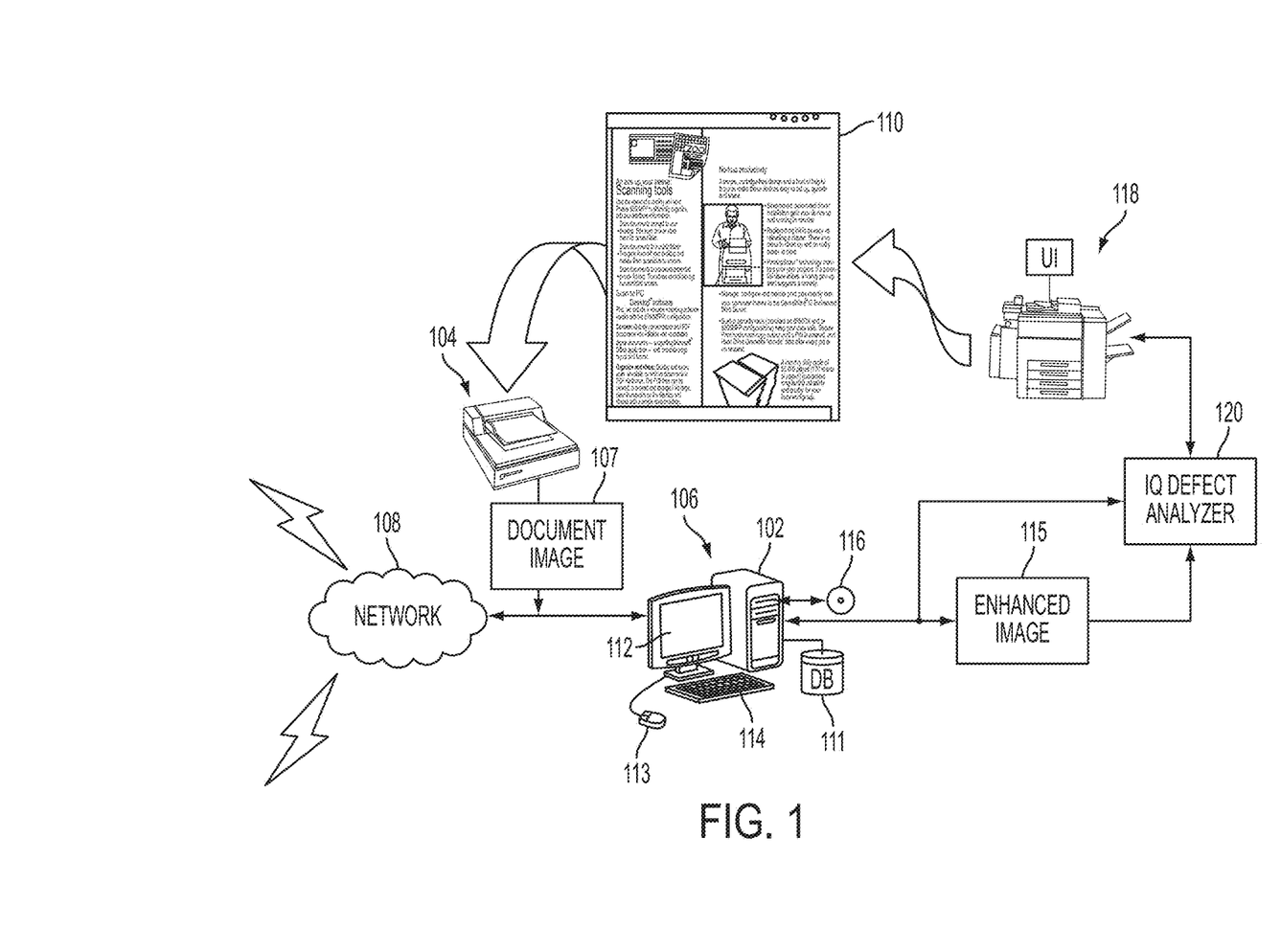
FIG. 1 illustrates an embodiment of an example networked computing system wherein various aspects of the present method are performed.

Reference is now being made to FIG. 1 which illustrates one embodiment of an example networked computing system wherein various aspects of the present method are performed.

Hardcopy document 110 is placed on the platen of scanning device 104. Specialized sensors move beneath the platen to scan the document placed thereon in order to generate an image 107 of document 110. Document image 107 is provided to computer workstation 106 for processing in accordance herewith. Document image 107 may also be provided to computer system 106 from a remote device (not shown) which has been placed in communication with computer 106 via network 108. Workstation 106 may alternatively retrieve document image 107 from storage device 111.

Figure 10:
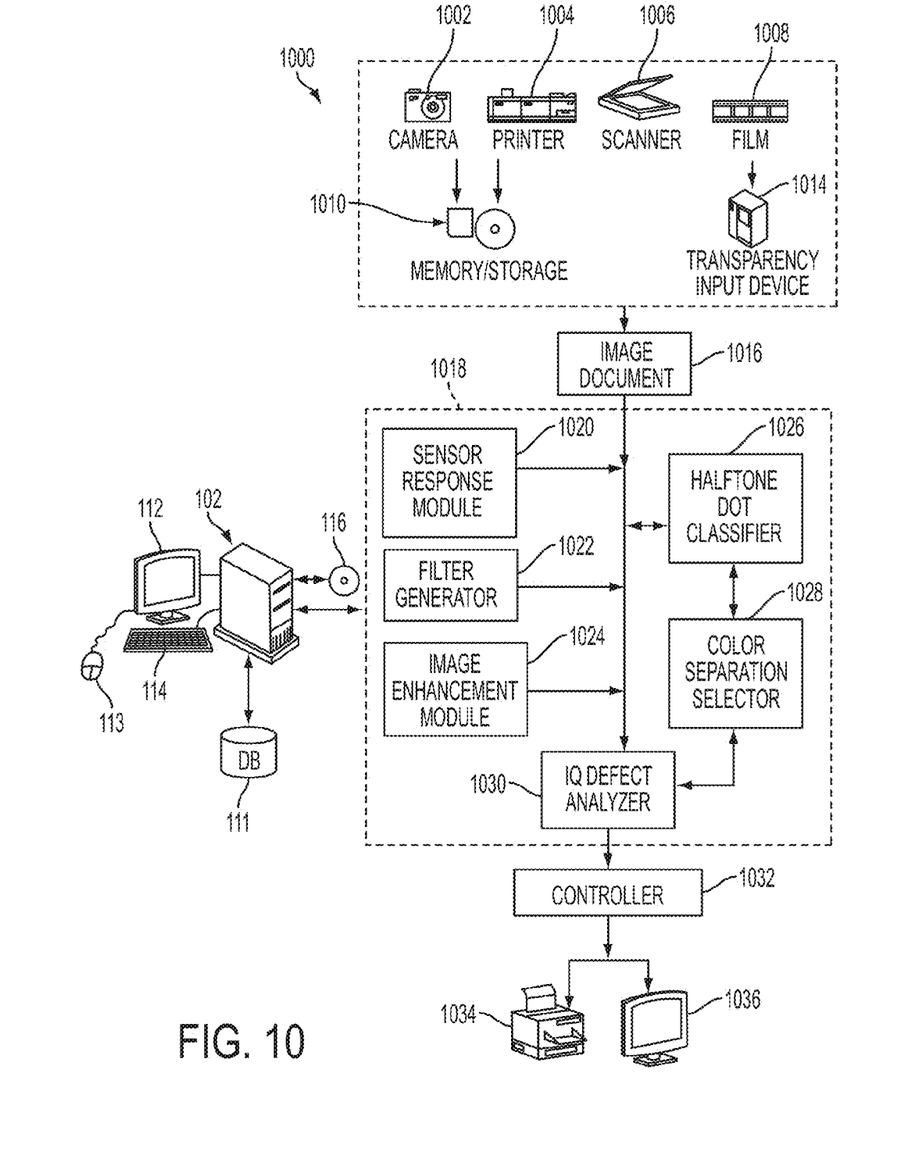
FIG. 10 is a functional block diagram which illustrates one example image quality processing system wherein various aspects of the present method for image quality defect analysis are performed.

Computer system 106 is configured to perform various aspects of the present method described with respect to the flow diagrams hereof and various aspects of the block diagram of FIG. 10. As discussed herein further, the sensor's resolving power deficiency is determined by characterizing the resolving power of the sensors. A response of a de-blurring filter is determined which is appropriate for compensating the resolving power of the sensor. Image enhancement is applied to image document 107 using the filter to obtain enhanced image 115. The sensor's responses to test patches printed using device 118 is also characterized and used for halftone dot classification. Halftone dots present on the enhanced image are classified for image quality defect detection. In another embodiment discussed herein further with respect to the embodiment of FIGS. 3 and 4, a spatially varying LUT is derived which relates sensor output signals to printer colorant signals and the halftone dots are classified using the LUT.

Information determined or otherwise obtained by workstation 106, including enhanced image 115 is provided to IQ Defect Analyzer 120. Analyzer 120 analyzes the enhanced halftone dot images for each selected single separation color to determine whether that color separation contains any defects and then signals device controllers within device 118 to make appropriate adjustments to one or more system settings if defects have been detected. One of ordinary skill will appreciate that print systems, such as device 118, have specialized controllers, circuitry, and components which can be instructed to re-configure or make adjustments to device specific settings to improve image quality in response to an image quality defect having been detected. Analyzer 120 may also signal a device operator to make such adjustments. A device operator can manually adjust system settings using a user interface of the device. A device specific setting is any setting which can be adjusted or configured, including workflow processes which the print system device can be programmed to perform to improve image quality. Analyzer 120 receives instructions from a remote device over network 108 and may also retrieve device specific settings from device 111 in response to an image quality defect having been detected. Storage device 111 may also store various characteristics and attributes of the sensor(s) of image input device 104. Such information may be saved in the form of records containing pre-determined sensor characteristics, device profiles, filter designs, and the like.

Networked system 106 includes a hard drive (internal to computer housing 102) which reads/writes to a computer readable media 116 such as a floppy disk, optical disk, CD-ROM, DVD, magnetic tape, etc. Case 102 houses a motherboard with a processor and memory, a communications link such as a network card, graphics card, and the like, and other software and hardware to perform the functionality of a computing device as is generally known in the arts. The workstation includes a graphical user interface which, in various embodiments, comprises display 112 such as a CRT, LCD, touch screen, etc., mouse 113, and keyboard 114. It should be appreciated that workstation 106 has an operating system and other specialized software configured to display a wide variety of numeric values, text, scroll bars, pull-down menus with user selectable options, and the like, for entering, selecting, or modifying information displayed on display 112. The embodiment shown is only illustrative. Although shown as a desktop computer, it should be appreciated that computer 106 can be any of a laptop, mainframe, client/server, or a special purpose computer such as an ASIC, circuit board, dedicated processor, or the like.

Information obtained from document image 107 including various characteristics of the sensors can be saved to database 111. Information about the document or the sensors may be entered by a user using the graphical user interface of computer 106. Any information about the document image, halftone dots, sensors, and the like, may be communicated to a remote device over network 108 for storage or processing. Network 108 is shown as an amorphous cloud. A detailed discussion as to the operation of any specific network or the network configuration has been omitted. Suffice it to say, packets of data are transmitted over the network via special purpose devices in communication with each other via a plurality of communication links. Data is transferred between devices in the network in the form of signals. Such signals may be in any combination of electrical, electro-magnetic, optical, or other forms, and are transmitted by wire, cable, fiber optic, phone line, cellular link, RF, satellite, or any other medium or communications link known in the arts.

Flow Diagram of a First Embodiment

As discussed in the background section hereof, there are two primary approaches to image quality defect detection such as WMJ detection, streak detection, banding detection, mottle detection, graininess detection etc. For image quality defect detection, there are methods that do not identify individual halftone dot directly but estimate the average amount of halftone dots (referred to as analysis in macro-view), i.e., approaches that analyze average colors across many pixels for defects. On the other hand, there are methods that attempt to identify individual halftone dots directly (referred to as analysis in micro-view), i.e., approaches that attempt to identify at the pixel level the color of the halftone dot and then determine the presence of image defects. There are advantages and disadvantages in both approaches. Using WMJ detection as an example, for the macro-view approach, the process direction resolution can be very low (e.g., 5 dpi). The macro-view approach requires some form of mapping that relates the average sensor outputs to the average colorant inputs for all possible levels using, for example, an RGB sensor for a CMYK printer in conjunction with additional information such as GCR level used. For the micro-view approach, there is no need to derive or apply the above mapping but a higher resolution is required so that the halftone dots can be properly resolved. The teachings hereof enable the micro-view approach while relieving this increased resolution requirement. The present method uses halftone dot classification to facilitate a determination as to which single separation color contains the defect. Another embodiment is disclosed herein which uses a spatially varying RGB→CMYK LUT for halftone dot classification and image quality defect detection.

In a first embodiment hereof, the sensor MTF is characterized (offline) and the MTF is used to design a de-blurring filter h (also offline). The sensor response is characterized from test patches in order to derive the centers and their corresponding variations for all 16 primaries (RGB→CMYK LUT). These, in turn, are used for halftone dot classification in a manner more fully described herein. Once the above-described information has been derived and stored, image quality defect analysis can be performed on the color marking device. In real time, a customer document is scanned to obtain RGB image (s). The RGB images are enhanced by processing the images through filter h. At each pixel of the enhanced images, the RGB value is compared to the RGB centers of the 16 primaries to determine a best match using, for example, a minimal Euclidean distance technique. The output will be a binary (0% or 100%) CMYK halftone dot image. The CMYK halftone dot image is analyzed for image quality defects. One can extend the 0%/100% binary results to intermediate levels (e.g. 25%, 50%, 75%) using the concept of 2×2 dot printer model disclosed in the above-incorporated U.S. Pat. No. 6,435,654, to Wang et al. This is generally not necessary for very high resolution sensing (e.g. 4× of the printer dot resolution) but can be beneficial for an equal resolution sensor or a slightly lower resolution sensor.

Figure 2:
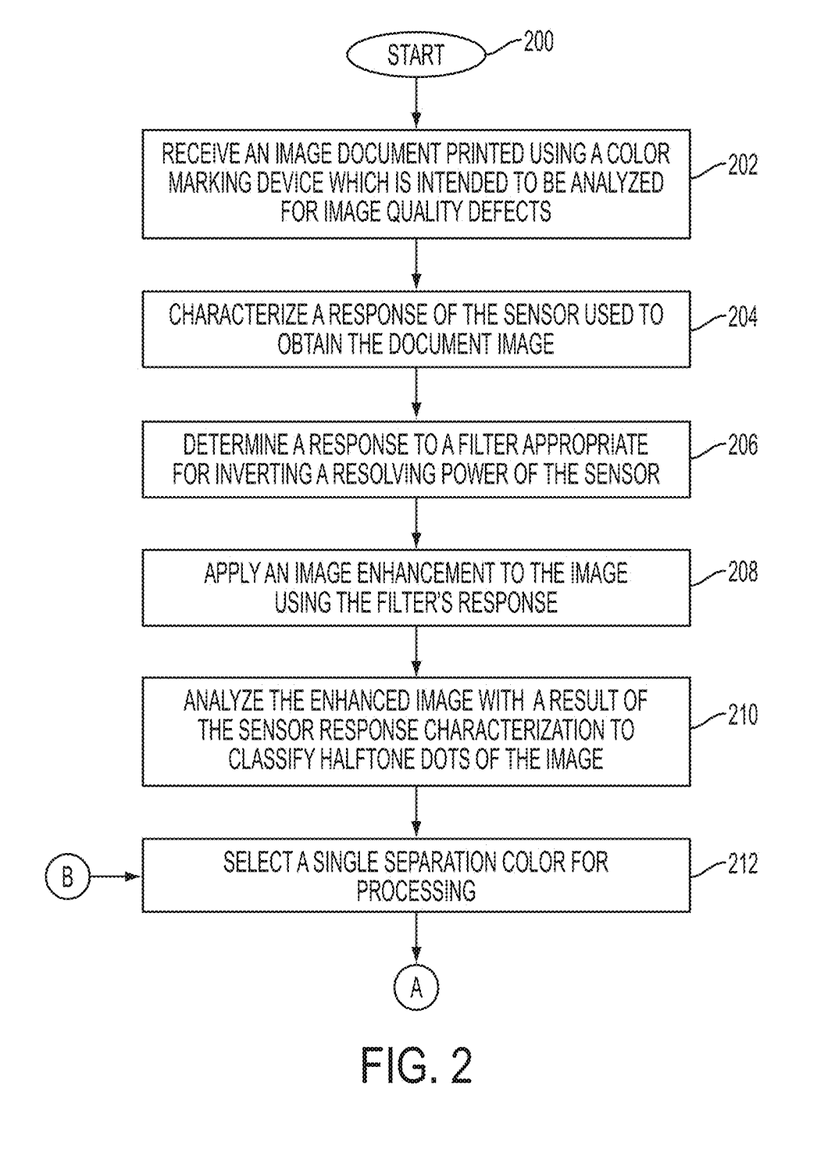
FIG. 2 is a flow diagram of one example embodiment of the present method for image quality defect analysis via classification of halftone dots present on a customer's print.

Reference is now being made to the flow diagram of FIG. 2 which illustrates one example embodiment of the present method for image quality defect analysis via halftone dot classification. Flow processing begins at step 200 and immediately proceeds to step 202.

At step 202, an image of a document is received for processing. The document was printed using a color marking device intended to be analyzed for image quality defects. One example color marking device is shown at 118 of FIG. 1. The hardcopy print of the document was scanned using scanner 104 of FIG. 1 to obtain document image 107.

Figure 6:
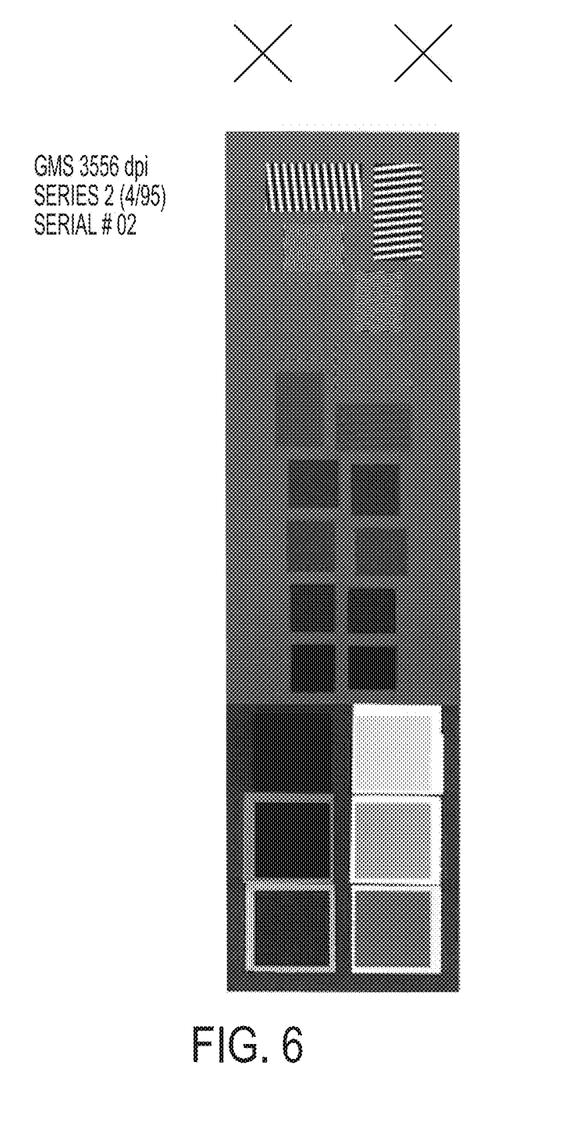
FIG. 6 is a scan of a test print designed for measuring the modulation transfer function (MTF) of a sensing device and is used to characterize the sensors of an Epson 10000XL scanner.
Figure 7:
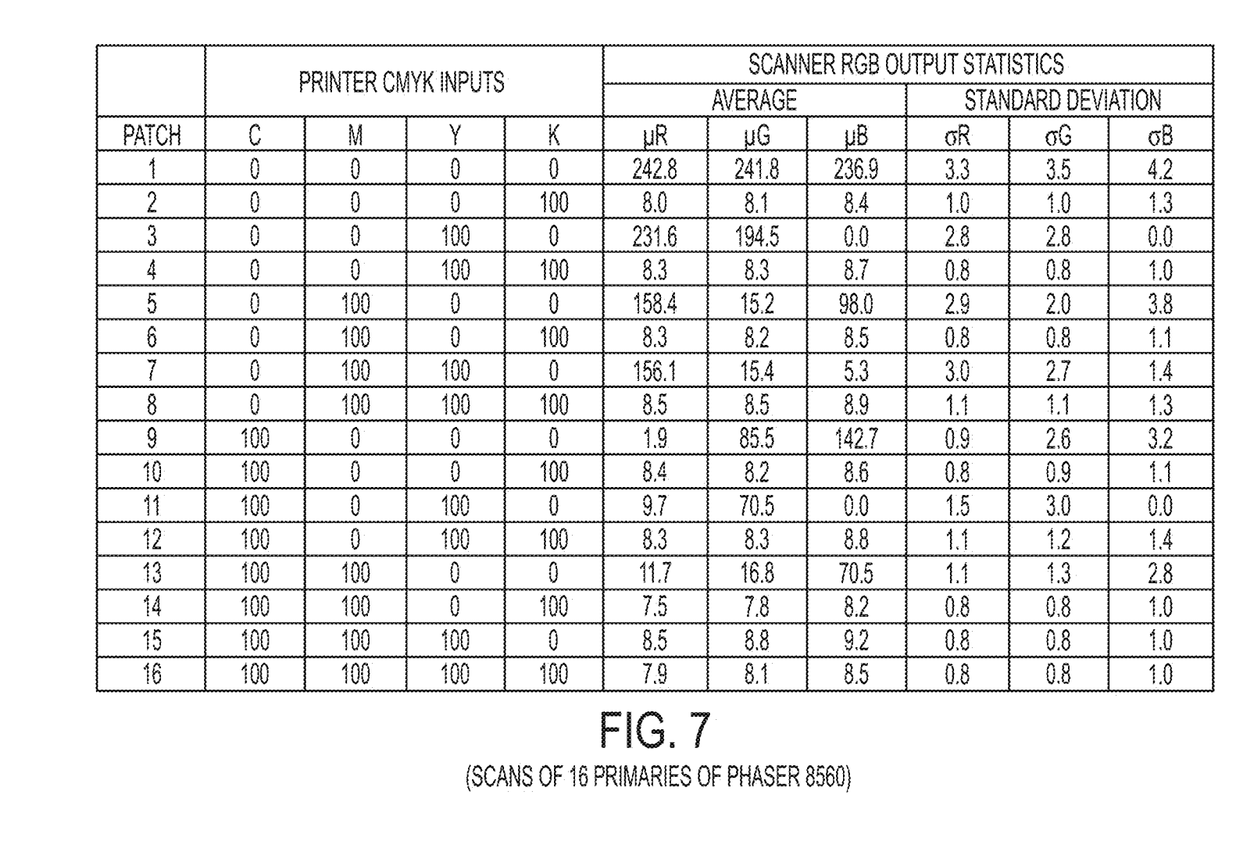
FIG. 7 is a Table containing results obtained during the characterization of a sensor response of test patches printed using a Phaser 8560 and scanned using an Epson 10000XL scanner at 300DPI.

At step 204, the sensor used to produce the document image is characterized. Characterizing the sensors involves analyzing a resolving power (MTF) of the sensor. The sensor is also characterized with respect to responses to a set of test patches printed by the color marking device. Methods for characterizing a resolving power of a sensor (i.e., measuring the sensor's MTF) such as, for example, ISO-12233 slanted-edge method and Xerox' Gray Measurement System (GMS) method, are well known. To characterize the sensor's resolving power, an example print (as shown in FIG. 6) was scanned using an Epson 10000XL scanner at a resolution of 300DPI. The data was then analyzed to determine the MTF of this sensor at the desired setting. In the print of FIG. 6, there are angled lines with various spacing at near-horizontal and near-vertical positions. These represent roughly 0.5, 1.5, 2.5, 4.0, 6.0, 7.0 and 11.0 c/mm respectively. There are also contone patches at various reflectance levels which are used to construct a tone reproduction curve (TRC) and to calibrate the sensor signals to a reflectance space. The angled lines with various spacing are used to determine the modulation amplitudes at their corresponding frequencies. The actual frequencies of these targets were further refined via Fourier analyses of the scan data. To characterize the sensor response to test patches, a total of 16 patches (16x16 mm²) (all possible CMYK combinations of 0% & 100%, thus $2^4$ combinations, for C/M/Y/K) were printed, scanned, and analyzed using a Phaser 8560 printer and an Epson 10000XL scanner at 300DPI. The results are shown in FIG. 7. The centers (mean of the RGB values) and variations (standard deviation of the RGB values) were used for the pixel-wise halftone dot classification step described herein further. Note that the RGB values of 9 patches (8 with K100%+other CMY combinations, and the CMY100%) are indistinguishable due to a limitation of the RGB sensor. Additional information about the native vector halftoning method employed by the Phaser 8560 was used to resolve those indistinguishable RGBs of above 9 patches. Information about the GCR strategy employed may also be required, depending on the print device under test. Information about the sensor may be entered by a user using workstation 106 or retrieved from storage device 111 or obtained from a remote device over network 108.

At step 206, a response to a de-blurring filter h is determined which is appropriate for compensating the MTF of the sensor. The response is determined offline and saved to a storage device. Methods are well established in the field of filter design given a desired frequency response. The key is to specify a desired frequency response acceptable within the computational costs one is willing to assume. For the purposes hereof, we chose un-sharp masking method for image enhancement which takes the form:

$$y'(i,j) = y(i,j) + \alpha \cdot (y(i,j) - y(i,j) * h(i,j)),$$

where, y(i,j) is the original image data at (i,j) position, h(i,j) is a low-pass kernel (e.g. Gaussian kernel with radius σ), α is a scaling factor used to boost the contrast of high-frequency contents, and y'(i,j) is the enhanced image data at (i,j) position. Note that for simplicity, a symmetric-shape filter is selected and thus will only look at 1-dimensional representation in the filter design (i.e. only a cross-section of the symmetric-shape filter in $f_x$-$f_y$ plane).

With that, one can look at the un-sharp masking operation in the frequency domain, given by:

$$Y'(f) = Y(f) + \alpha(Y(f) - Y(f)H(f))$$

That is, $$Y'(f) = (1 + \alpha - \alpha H(f))Y(f) \text{ or}$$

$$Y(f) = \frac{1}{1 + \alpha - \alpha H(f)} Y'(f).$$

As a result, the desired frequency responses for the present method should have 1+α−αH(f) close to the "inversion" of the sensor MTF. Correspondingly, we would like 1/(1+α−αH(f)) to approximate the sensor MTF. Since for simplicity we have restricted the filter to a Gaussian kernel, the task remaining is to find appropriate values for α (scaling) and σ (radius of the filter kernel). Combining with the result in characterizing the MTF of the sensor, we have found that (α,σ)=(3,2.5) is an appropriate setting.

Figure 8:
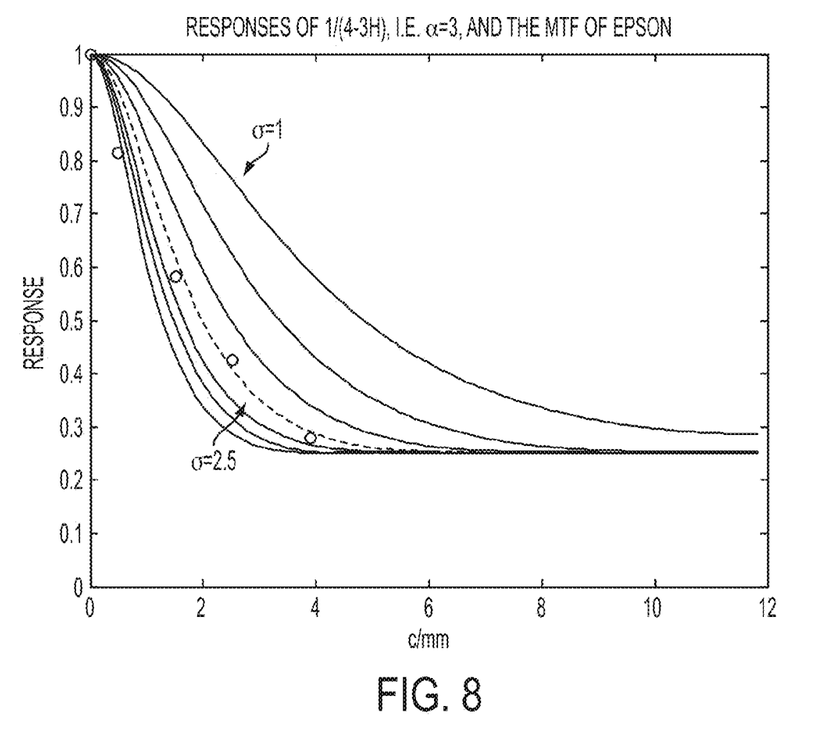
FIG. 8 shows the results of a filter for compensating for the MTF of an Epson 10000XL scanner at 300DPI.

FIG. 8 shows results of filter-design for compensating the MTF of an Epson 10000XL scanner at 300DPI. Here, the lines are frequency responses of Gaussian kernel with α=3, σ=1, 1.5, 2, . . . , 4. Circled points 802 represent the measured MTF. Integrating Cavity effects (ICE) can also be taken into account in designing the filter. A user may enter information about the filter or modify any parameters thereof using the interface of workstation 106.

Figure 9:
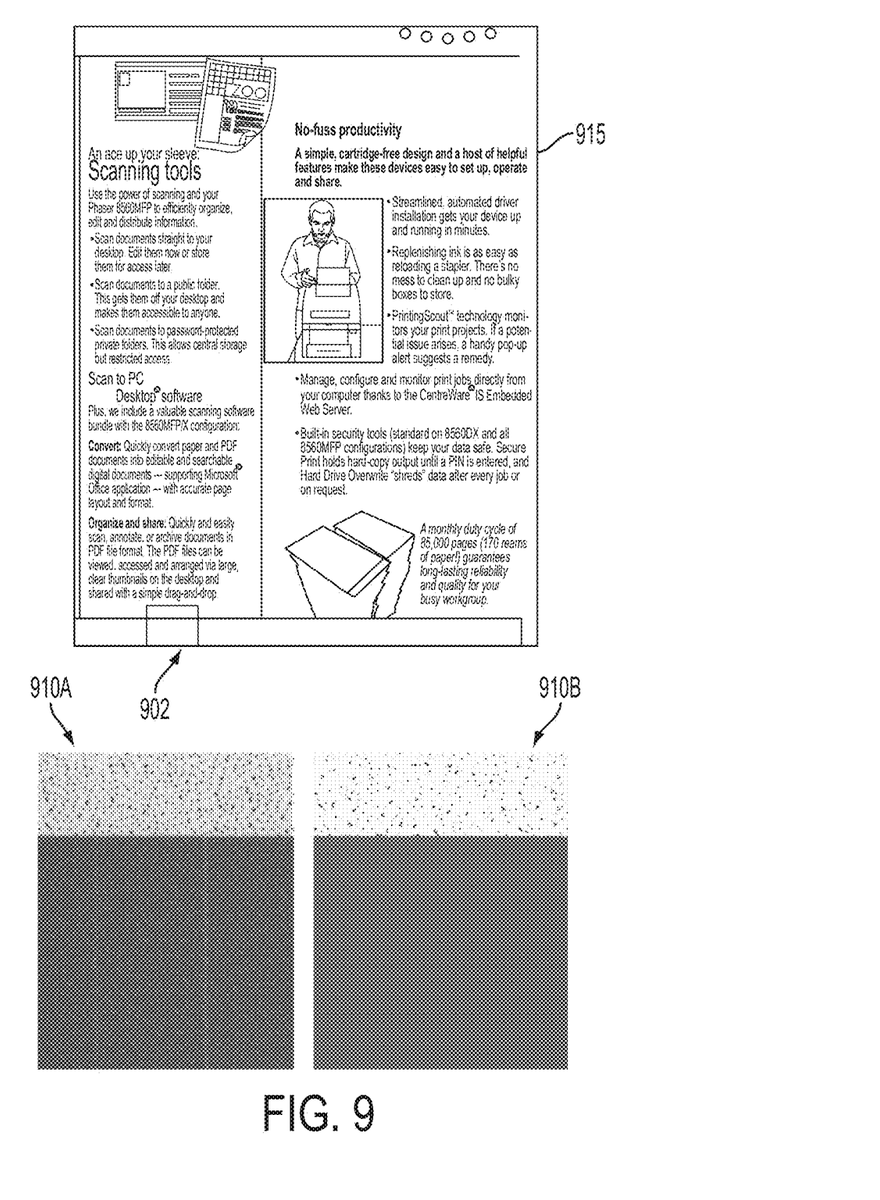
FIG. 9 shows an enhanced document image 915 (corresponding to enhanced image 115 of FIG. 1), and further showing enlarged image portions 910A-B from image section 902.

At step 208, the filter h is used to enhance the image. An example enhanced document image is shown at 915 of FIG. 9 which shows a resulting halftone dot image for a 300DPI scan. FIG. 9 illustrates area 902. Enhanced portion 910A has filter h applied, and portion 910B is without filter h. By a visual comparison of the differences between image portions 910A and 910B, it can be shown that it is advantageous to apply the de-blurring filter h in advance of halftone dot classification. It should be noted that the requirement of the accuracy of the identified CMYK halftone dot images is application dependent.

At step 210, the halftone dots of the enhanced image are classified using the results of the sensor response characterization (of step 204). Since the RGB of a pixel in the image depends not only on the actual halftone dot of that pixel but also its surrounding pixels, it is appropriate to take the RGB values of neighboring pixels into account when determining the best match (i.e. use a spatially varying criterion for finding the best match).

One method for halftone dot classification comprises a 2-stage approach wherein the RGB value of each pixel is first compared against the (non-spatial) RGB→CMYK LUT (Table of FIG. 7). If the RGB value of the pixel is within the range of one of the primaries, the halftone dot of the pixel has been determined (e.g., labeled as 1). If not, the best match (using a Euclidean distance) is assigned to the pixel as a first guess but labeled '0' to indicate that further confirmation is needed. Note that these are those pixels that have surrounding pixels that are similar to them. For those that fail the initial criteria, further classification can be performed as follows. Next, work only on the pixels labeled as 0 from the first stage. For a pixel labeled '0', calculate the 16 spatially modified primary centers using the weighted average RGB's of its N×N surrounding pixels. For example, let us use equal weightings, assume N=3, and assume that the current pixel is surrounded by (0,0,0,0) based on the stage 1 result. The new center for (0,0,0,0) is the same, the new center for (0,0,0,100) is 8/9*RGB of old (0,0,0,0) and 1/9*RGB of old (0,0,0,100), etc. Next, find the best match between the RGB of the current pixel and the 16 spatially modified primary centers as the halftone dot for the current pixel. Note that, in effect, this 2-stage method uses the non-spatially varying RGB→CMYK LUT for the primaries to find best matches for pixels that are surrounded by similar colors (near-uniform areas) and uses the spatially varying RGB→CMYK LUT for the primaries to find best matches for the remaining pixels (such as in highlight, edges, etc.). Once the halftone dots have been classified, at step 212, a single separation color is selected for processing.

Figure 3:
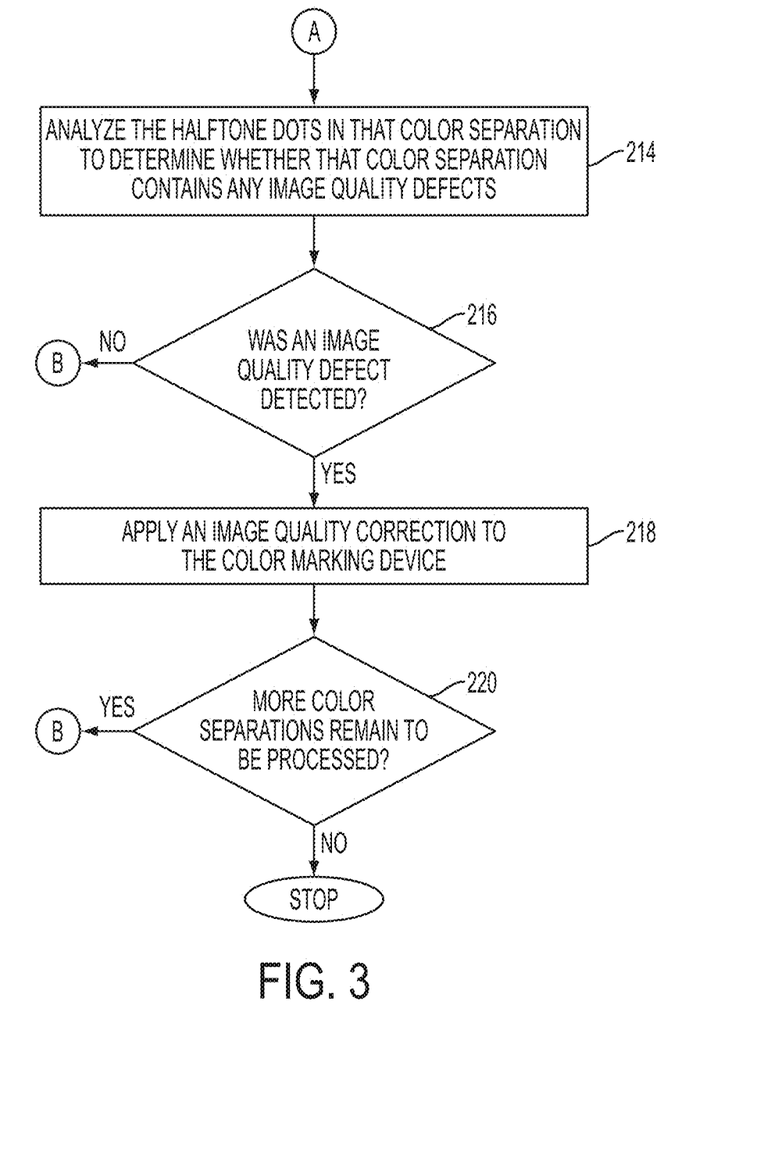
FIG. 3 is a continuation of the flow diagram of FIG. 2 with processing continuing with respect to node A.

Reference is now being made to FIG. 3 which is a continuation of the flow diagram of FIG. 2 with flow processing continuing with respect to node A.

At step 214, the classified pixels in the single separation color are analyzed to determine whether any image quality defects can be identified in that color separation.

At step 216, a determination is made whether a defect is present. If no defects are present in the selected color separation then processing repeats with respect to node B wherein, at step 212 in FIG. 2, a next color separation is selected for processing. If a defect was detected then, at step 218, an operator is signaled or otherwise alerted to the detected defect, and appropriate adjustments can be applied to the color marking device.

At step 220, a determination is made whether any more color separations remain to be processed. If so then processing repeats with respect to node B wherein, at step 212 in FIG. 2, a next single separation color of the color marking device being analyzed is selected or otherwise identified for processing. Halftone dots in the enhanced image in that color separation are analyzed to determine whether that color separation contains any image quality defects. If so then corrective measures can be undertaken or an operator alerted. Processing repeats for all desired single separation colors until all color separations have been processed. Thereafter, further processing stops.

Flow Diagram of a Second Embodiment

In this embodiment, instead of manipulating pixel values of the scans via filtering as in the above-described embodiment and then applying a two-stage halftone classification approach where these values are first compared to a spatially-invariant RGB→CMYK LUT and then optionally a subset of pixels are compared to a spatially varying RGB→CMYK LUT, a spatially varying RGB→CMYK LUT is created which is tailored for each pixel based on the pixel values of surrounding pixels. Then, each pixel at location (i,j) is classified to one of the 16 halftone dots based on a closest Euclidean distance to the modified centroids of the 16 primaries of the characterized sensor response. Here, the modification is based on the weighted average of values of pixels in a neighborhood of pixels surrounding center pixel (i,j) (pixel (i,j) is excluded) and the original spatially-invariant centroids of the 16 primaries (Table of FIG. 7).

Figure 4:
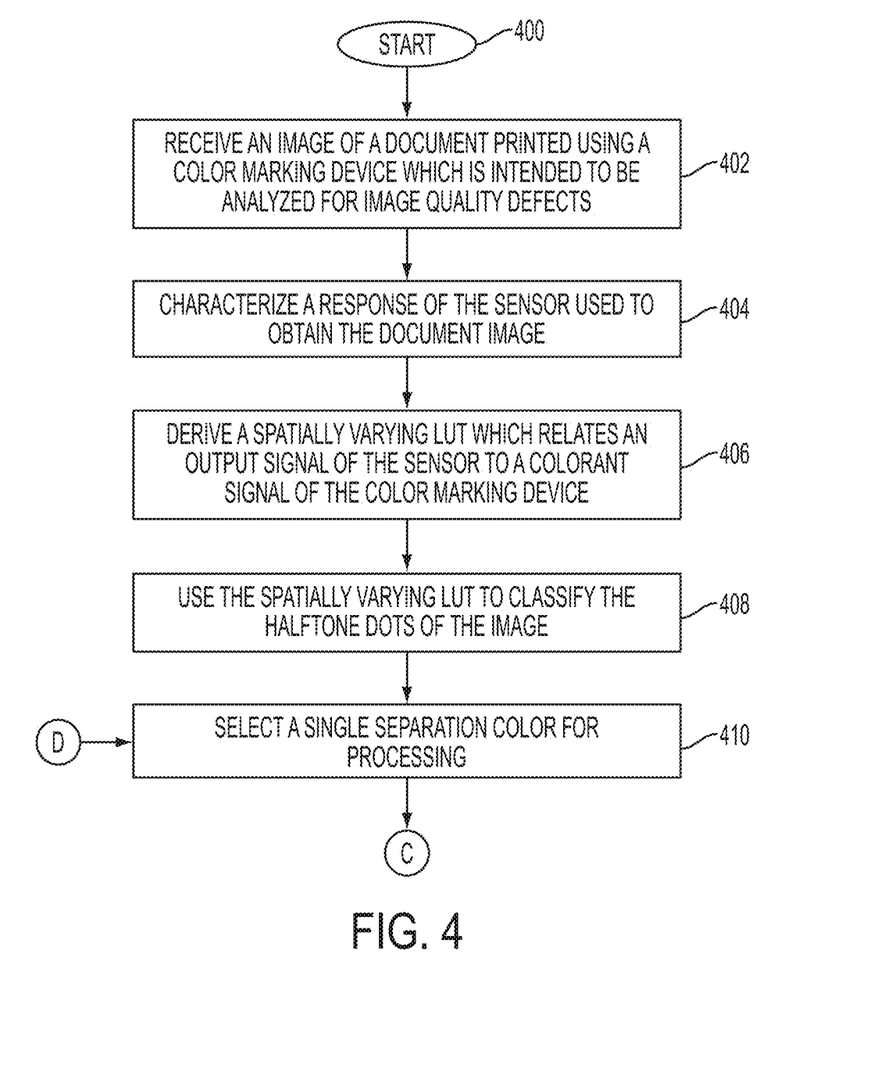
FIG. 4 is a flow diagram of another example embodiment of the present method for image quality defect analysis via halftone dot classification.

Reference is now being made to the flow diagram of FIG. 4 which illustrates another embodiment of the present method for image quality defect detection. Flow processing begins at step 400 and proceeds to step 402.

At step 402, an image of a printed document is received or otherwise obtained for processing in accordance herewith. The document image is received in a manner as previously discussed with respect to step 202 of FIG. 2.

At step 404, characterize the response of the sensor used to produce the document image such that halftone dots in the image can be classified. Characterizing the sensors is performed in a manner described above with respect to step 204 of FIG. 2.

At step 406, a spatially varying LUT is derived. The spatially varying LUT relates an output signal of the characterized sensor response to a colorant signal of the color marking device. At step 408, the spatially varying LUT is used to classify the halftone dots. Once classified, processing proceeds in a manner similar to that described above wherein, at step 410, a single separation color is selected for processing.

Figure 5:
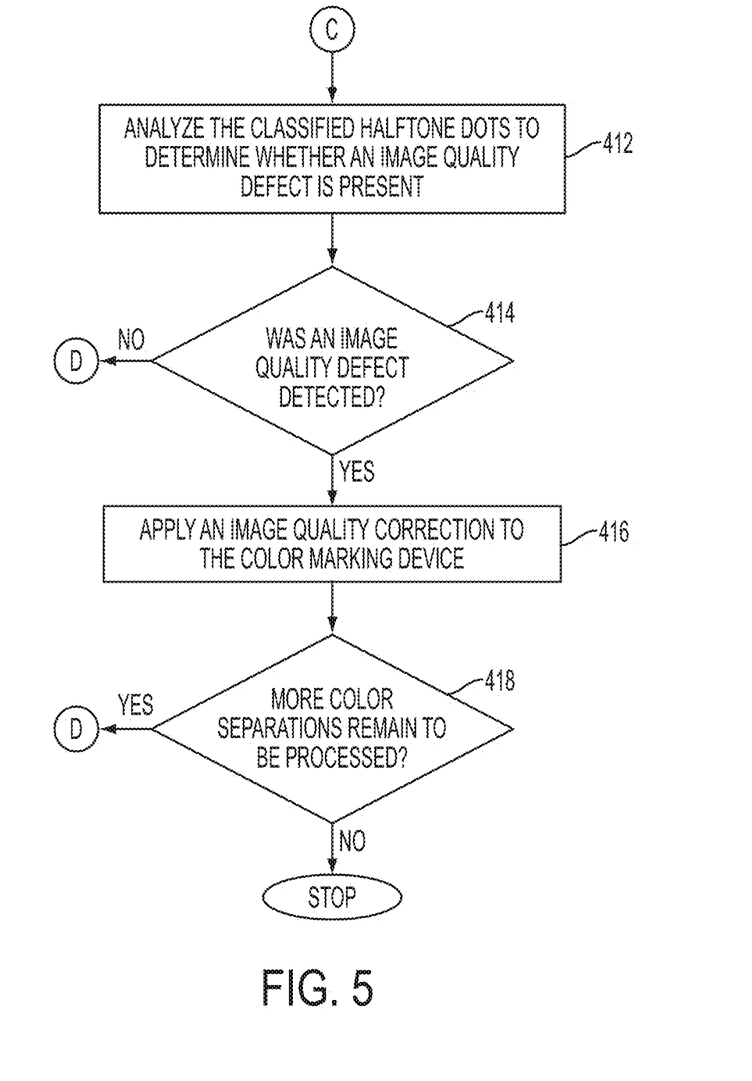
FIG. 5 is a continuation of the flow diagram of FIG. 4 with flow processing continuing with respect to node C.

Reference is now being made to the flow diagram of FIG. 5 which is a continuation of the flow diagram of FIG. 4 with flow processing continuing with respect to node C.

At step 412, the classified pixels are analyzed in the selected color separation to determine whether any image quality defects are present.

At step 414, a determination is made whether a defect is detected. If not then processing repeats with respect to step 410 wherein a next color separation is selected for processing. If a defect was detected then, at step 416, an operator is signaled or otherwise alerted to the detected defect. Appropriate image quality correction is applied to the color marking device.

At step 418, a determination is made whether any more color separations remain to be processed. If so then processing repeats with respect to step 410 wherein a next single separation color is selected. Processing repeats for all desired single separation colors. Thereafter, processing stops.

Example Functional Block Diagram

Reference is now being made to FIG. 10 which illustrates a functional block diagram of one embodiment of an example image quality processing system wherein various aspects of the present method for image quality defect analysis via halftone dot classification can be performed. The system illustrates a plurality of image input devices, at 1000, each capable of capturing the document image (110 of FIG. 1) and providing an image document 1016 to image quality processing module 1018 shown residing as any of a hardware or software embodiment within computer system 102.

In FIG. 10, an image of a customer document is captured using any of a variety of input devices such as, for instance, a digital camera 1002 or using a copying function of print system 1004. A document image may be captured using document scanning device 1006. The customer's document may reside on a color film 1008 and captured via transparency input device 1014. The document image may be retrieved from a storage device such as a floppy disk, or CDROM 116, or micro-SD memory 1010, having been transferred thereon by camera 1002 or printer 1004. Pixel values of the captured document image are transferred to image quality processing module 1018 for processing. Image quality processing module 1018 executes various aspects of the present method on the received document image 1016. Sensor Response Module 1020 retrieves the characterized response of the sensor used to produce the document image. Filter Generator 1022 retrieves the determined de-blurring filter which inverts the resolving power of the sensor. Image Enhancement Module 1024 enhances the received document image using the determined filter response. Halftone Dot Classifier 1026 receives the enhanced image and classifies the halftone dots. Color Separation Selector 1028 selects the single separation color for processing. The color separation may be entered by a user using the graphical user interface of workstation 102. IQ Defect Analyzer 1030 analyzes the classified pixels to determine whether an image quality defect is present in the selected color separation. Results thereof are provided to Controller 1032 and corrections are either made to target color marking device 1034 or displayed for the user on monitor 1036.

It should be understood that any of the modules and processing units of FIG. 10 are in communication with workstation 102 via pathways (not shown) and may further be in communication with one or more remote devices over network 108. Any of the modules may communicate with storage device 111 via pathways not shown and may store/retrieve data, parameter values, functions, pages, records, data, and machine readable/executable program instructions required to perform their intended functions. It should be appreciated that some or all of the functionality for any of the modules may be performed, in whole or in part, by components internal to workstation 102 or by a special purpose computer system. It should also be appreciated that various modules may designate one or more components which may, in turn, comprise software and/or hardware designed to perform the intended function. A plurality of modules may collectively perform a single function. Each module may have a specialized processor and memory capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

The teachings hereof can be implemented in hardware or software using any known or later developed systems, structures, devices, and/or software by those skilled in the applicable art without undue experimentation from the functional description provided herein with a general knowledge of the relevant arts. Such a special purpose computer system is capable of executing machine executable program instructions and may comprise a micro-processor, micro-controller, ASIC, electronic circuit, or any combination thereof. The special purpose computer can be integrated, in whole or in part, with a xerographic system or a color management or image processing system.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for image quality defect detection on customer prints, the method comprising:

receiving an image of a document printed using a color marking device intended to be analyzed for image quality defects;

characterizing a resolving power of a sensor used to scan said image such that a deficiency of said resolving power can be determined;

compensating for a resolving power deficiency of a sensor that generated said image, said compensating comprising: such that pixels in said image can be classified according to the colorants present at the corresponding location of said document determining a response of a de-blurring filter appropriate for compensating for said sensor's resolving power deficiency, said response being determined with respect to a Modulation Transfer Function (MTF) of said sensor; and applying an image enhancement to said image using said filter to obtain an enhanced image;

classifying halftone dots on said enhanced image according to colorants present at a corresponding location of said image, said classification comprising:

comparing a value for each pixel of said compensated image and a plurality of colorant combinations of said color marking device and, in response to said value being within a range of one of said colorant combinations, classifying said halftone dots as one of said colorant combinations, otherwise:

deriving a plurality of mean colors, where each mean color represents an output signal value of said sensor corresponding to a known colorant combination of said color marking device;
determining color differences between each pixel of said compensated image and said plurality of mean colors; and
using said color differences to classify each halftone dot based on an index of a mean color that yields a minimum difference; and
analyzing said classified halftone dots of at least one color separation to determine whether said color separation contains an image quality defect.

2. The method of claim 1, further comprising refining said halftone dot classification for at least one pixel whose minimum color difference from said mean color is above a prespecified threshold, based on the classification results of a neighborhood of pixels surrounding that pixel.

3. The method of claim 1, wherein the classifying halftone dots includes classifying using a two-step process by classifying said halftone dots as one colorant combination using a first label value, otherwise classify said halftone dots with a second label.

4. A system for image quality defect detection on customer prints, the system comprising:
a memory and a storage medium; and
a processor in communication with said storage medium and said memory, said processor executing machine readable instructions for performing:
receiving an image of a document printed using a color marking device intended to be analyzed for image quality defects;
characterizing a resolving power of a sensor used to scan said image such that a deficiency of said resolving power can be determined;
compensating for a resolving power deficiency of a sensor that generated said image, said compensating comprising:
determining a response of a de-blurring filter appropriate for compensating for said sensor's resolving power deficiency, said response being determined with respect to a Modulation Transfer Function (MTF) of said sensor; and
applying an image enhancement to said image using said filter to obtain an enhanced image;
classifying halftone dots on said enhanced image according to colorants present at a corresponding location of said image, said classification comprising:
comparing a value for each pixel of said compensated image and a plurality of colorant combinations of said color marking device and, in response to said value being within a range of one of said colorant combinations, classifying said halftone dots as one of said colorant combinations, otherwise:
deriving a plurality of mean colors, where each mean color represents an output signal value of said sensor corresponding to a known colorant combination of said color marking device;
determining color differences between each pixel of said compensated image and said plurality of mean colors; and
using said color differences to classify each halftone dot based on an index of a mean color that yields a minimum difference; and
analyzing said classified halftone dots of at least one color separation to determine whether said color separation contains an image quality defect.

5. The system of claim 4, further comprising refining said halftone dot classification for at least one pixel whose minimum color difference from said mean color is above a prespecified threshold, based on the classification results of a neighborhood of pixels surrounding that pixel.

6. The system of claim 4, wherein the classifying halftone dots includes classifying using a two-step process by classifying said halftone dots as one colorant combination using a first label value, otherwise classify said halftone dots with a second label.

7. A method for image quality defect detection on customer prints, the method comprising:
receiving an image of a document printed using a color marking device intended to be analyzed for image quality defects;
characterizing a resolving power of a sensor used to scan said image such that a deficiency of said resolving power can be determined;
compensating for a resolving power deficiency of a sensor that generated said image, said compensating comprising:
determining a response of a de-blurring filter appropriate for compensating for said sensor's resolving power deficiency, said response being determined with respect to a Modulation Transfer Function (MTF) of said sensor; and
applying an image enhancement to said image using said filter to obtain an enhanced image;
classifying halftone dots on said enhanced image according to colorants present at a corresponding location of said image, said classification comprising a two stage approach:
in stage 1 of said two stage approach, comparing a value for each pixel of said compensated image and a plurality of colorant combinations of said color marking device and, in response to said value being within a range of one of said colorant combinations, classifying said halftone dots as one of said colorant combinations using a first label value, otherwise classifying said halftone dots with a second label value:
in stage 2 of said two stage approach, for each of said halftone dots classified with the second label value, deriving a spatially varying RGB→CMYK LUT which relates an output signal of said sensor to a colorant signal of said color marking device; and using said spatially varying RGB→CMYK LUT to classify said halftone dots; and
analyzing said classified halftone dots of at least one color separation to determine whether said color separation contains an image quality defect.

8. A system for image quality defect detection on customer prints, the system comprising:
a memory and a storage medium; and
a processor in communication with said storage medium and said memory, said processor executing machine readable instructions for performing the method of:
receiving an image of a document printed using a color marking device intended to be analyzed for image quality defects;
characterizing a resolving power of a sensor used to scan said image such that a deficiency of said resolving power can be determined;
compensating for a resolving power deficiency of a sensor that generated said image, said compensating comprising:
determining a response of a de-blurring filter appropriate for compensating for said sensor's resolving power deficiency, said response being determined with respect to a Modulation Transfer Function (MTF) of said sensor; and applying an image enhancement to said image using said filter to obtain an enhanced image;

classifying halftone dots on said enhanced image according to colorants present at a corresponding location of said image, said classification comprising a two stage approach:

in stage 1 of said two stage approach, comparing a value for each pixel of said compensated image and a plurality of colorant combinations of said color marking device and, in response to said value being within a range of one of said colorant combinations, classifying said halftone dots as one colorant combination using a first label value, otherwise classifying said halftone dots with a second label value;

in stage 2 of said two stage approach, for each of said halftone dots classified with the second label value, deriving a spatially varying RGB→CMYK LUT which relates an output signal of said sensor to a colorant signal of said color marking device; and using said spatially varying RGB→CMYK LUT to classify said halftone dots; and analyzing said classified halftone dots of at least one color separation to determine whether said color separation contains an image quality defect.

* * * * *